L. R. AGOSTINI.
WAVE MOTOR.
APPLICATION FILED SEPT. 4, 1912.

1,064,417.

Patented June 10, 1913.

3 SHEETS—SHEET 1.

Witnesses

Inventor
L. R. Agostini

By

L. R. AGOSTINI.
WAVE MOTOR.
APPLICATION FILED SEPT. 4, 1912.

1,064,417.

Patented June 10, 1913.
3 SHEETS—SHEET 2.

Witnesses
J. Milton Jester

Inventor
L. R. Agostini

By C. L. Parker
Attorney

L. R. AGOSTINI.
WAVE MOTOR.
APPLICATION FILED SEPT. 4, 1912.
1,064,417.
Patented June 10, 1913.
3 SHEETS—SHEET 3.
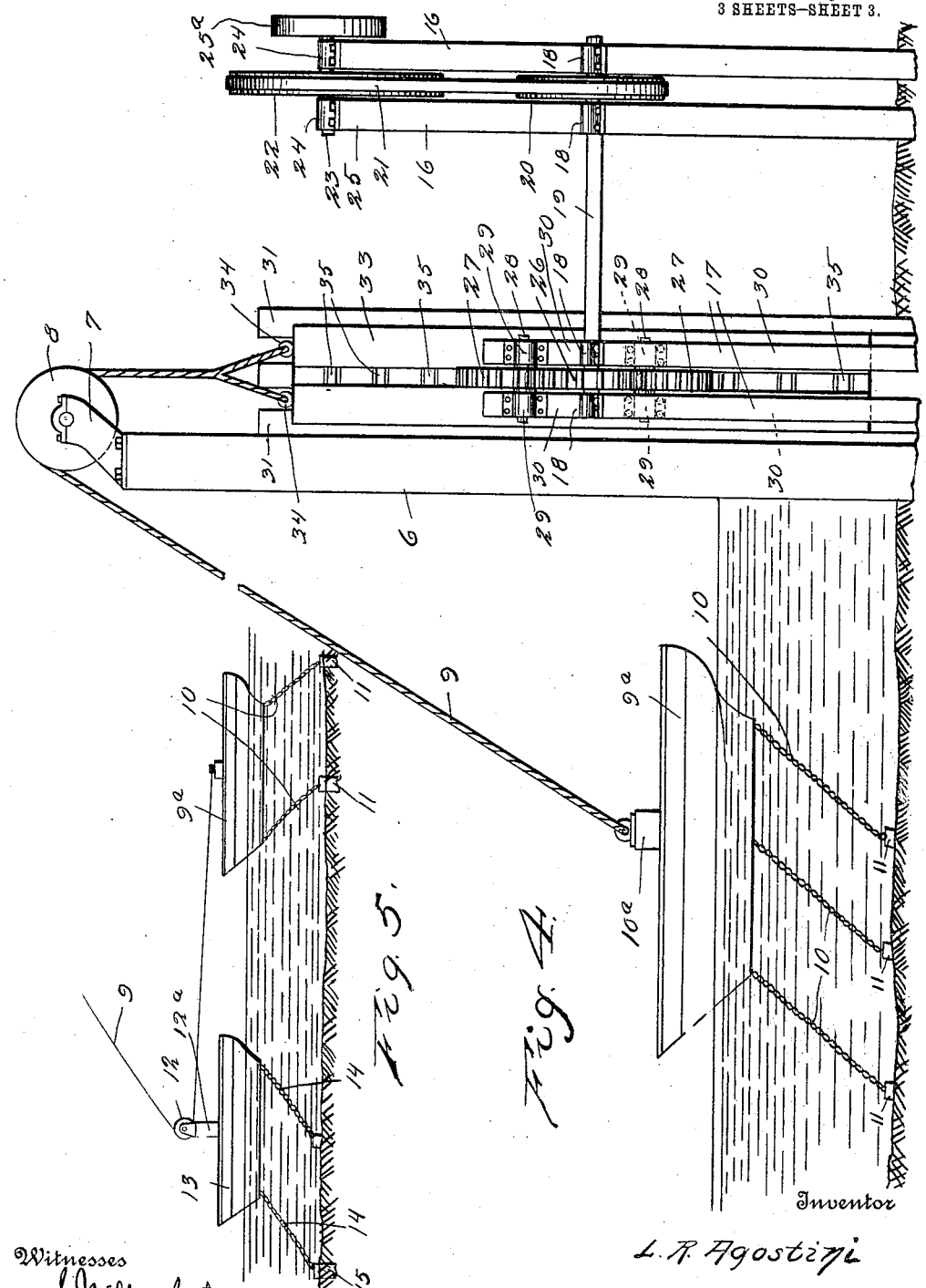
Witnesses
J. Milton Jester
B. J. Ashburn
Inventor
L. R. Agostini
By
C. L. Parker
Attorney

UNITED STATES PATENT OFFICE.

LUIS RAFAEL AGOSTINI, OF CARACAS, VENEZUELA.

WAVE-MOTOR.

1,064,417.　　　　Specification of Letters Patent.　　Patented June 10, 1913.

Application filed September 4, 1912. Serial No. 718,573.

*To all whom it may concern:*

Be it known that I, LUIS R. AGOSTINI, a citizen of the Republic of Venezuela, residing at Caracas, in the Federal District and Republic of Venezuela, have invented certain new and useful Improvements in Wave-Motors, of which the following is a specification.

My invention relates to new and useful improvements in machines which are ordinarily termed "wave motors," and are employed to convert the motion of the waves or tides into available force or power to drive different machinery.

An important object of this invention is to provide a machine of the above mentioned character, which utilizes in its operation the forces of potential energy of an elevated weight and the movement of waves or tides to return the weight to its elevated position after its descent.

A further object of the invention is to provide novel means to convert reciprocatory motion into a continuous rotary motion.

A further object of the invention is to provide a machine of the above mentioned character, which is positive and reliable in operation and capable of developing high power.

A further object of the invention is to provide a wave motor which is simple in construction, cheap to manufacture, strong, and durable.

Other objects and advantages of the invention will be apparent during the course of the following description.

Figure 1:
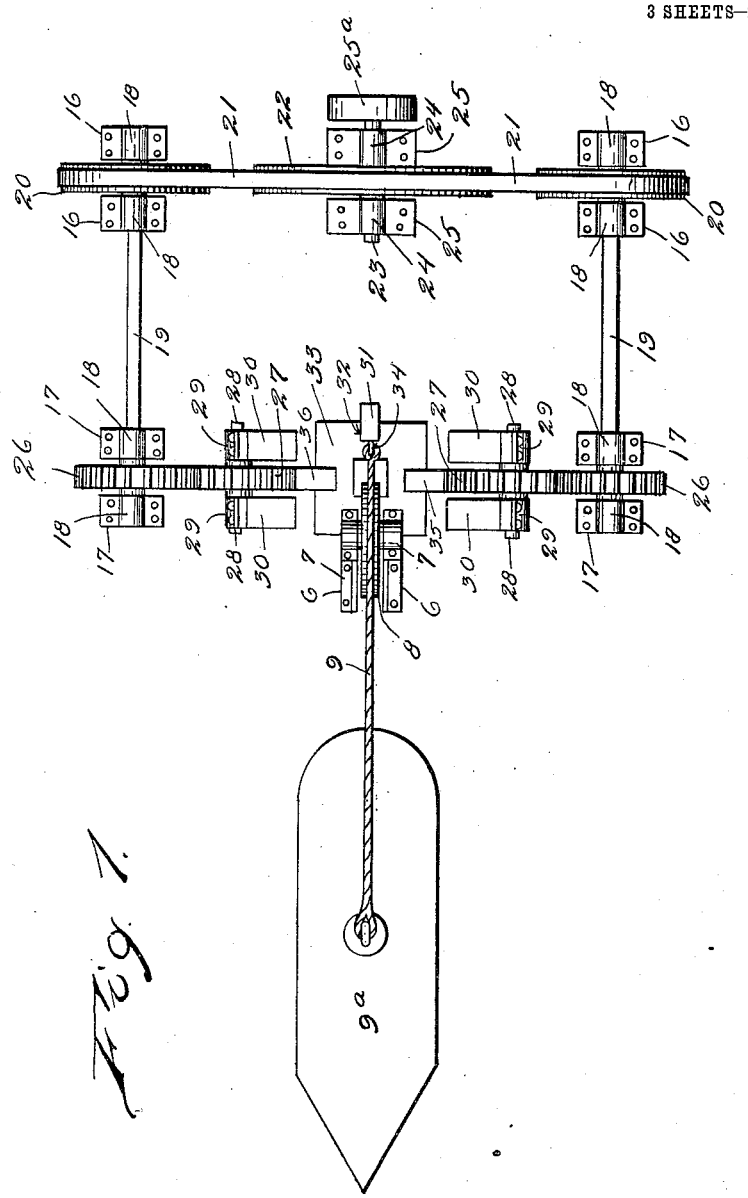
Figure 2:
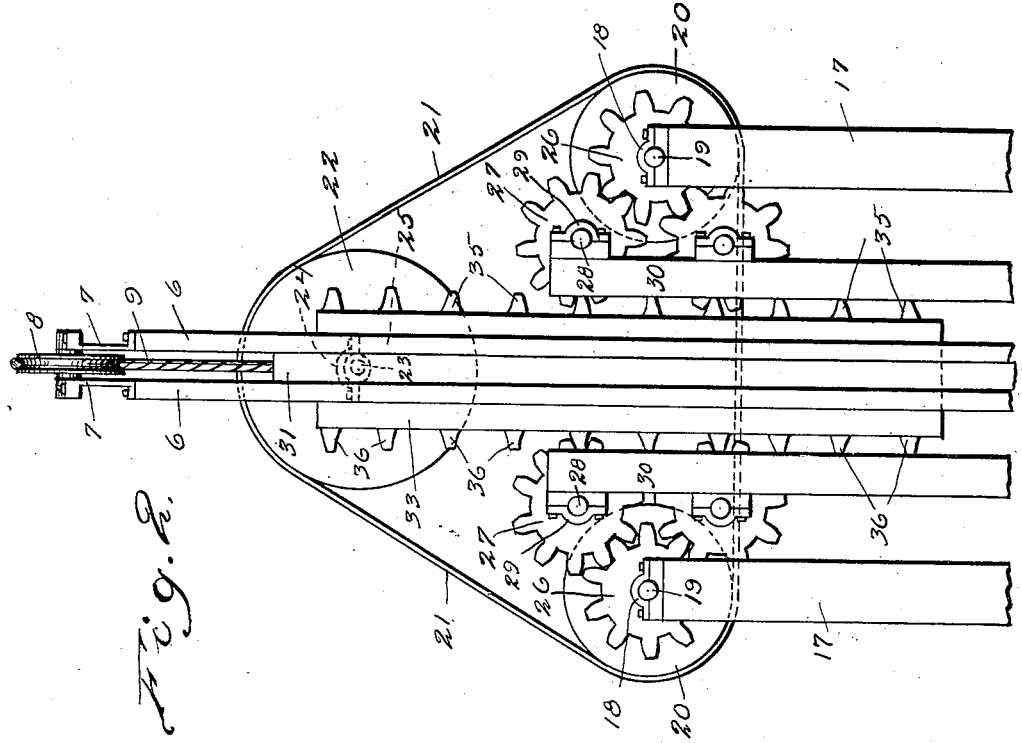
Figure 3:
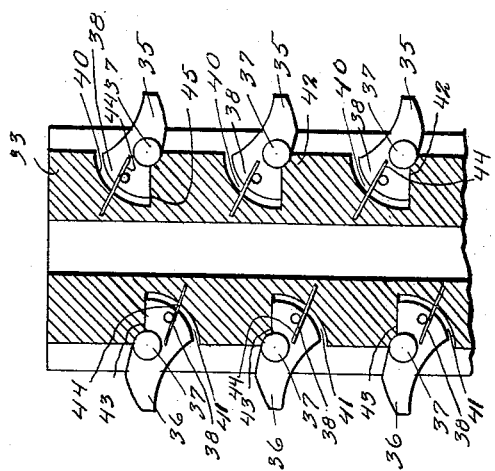

In the accompanying drawings forming a part of this specification and in which like numerals are employed to designate like parts throughout the same, Figure 1 is a plan view of the entire machine, Fig. 2 is a side view of the mechanism for converting reciprocatory motion into rotary motion, Fig. 3 is a detail sectional view through the reciprocatory element of the mechanism, Fig. 4 is a side view of the entire machine taken at a right angle to Fig. 2, and, Fig. 5 is a side view of a slightly modified form of the invention.

In the drawings, wherein for the purpose of illustration, I have shown a preferred embodiment of my invention, the numeral 6 designates an upstanding post or support, which is planted upon the shore and upon the upper end of which is mounted a bracket or bearing 7, receiving a grooved pulley 8. Disposed about this grooved pulley is a steel cable 9 or other flexible element extending downwardly to be attached to a movable float $9^a$. This float may be in the form of a ship, raft or any similar structure, but is preferably in the form of a ship with a completely closed deck, which may be provided with a suitable number of hermetically sealed hatchways. The float $9^a$ is connected to anchor chains 10, which are attached to fixed anchors, weights, or piles 11. It is thus seen that the chains 10 retain the float $9^a$ in proximity to the piles or anchors 11 but allow of the free approximately horizontal reciprocatory movement of the float in a longitudinal direction. The anchor chains restrict the vertical movement of the float by the waves, said float moving longitudinally in the arc of a circle.

The cable 9 is attached to an upstanding cylinder $10^a$, which is arranged centrally of the float or ship $9^a$. This cylinder starts from the bottom of the ship and terminates above the deck, the same being firmly mortised in the ship in such a fashion as to be in effect, integral therewith.

In the modified form of the invention in Fig. 5, I have shown the cable 9 passing about a second grooved pulley 12 which is connected with a second movable float or ship 13, through the medium of an upstanding cylinder $12^a$ which is attached to the ship 13 in a similar manner to the attachment of the cylinder $10^a$, hereinabove described. This second float is held against undue movements by anchor chains 14, which are attached at their lower ends to anchors, weights, or piles 15. Use is thus made of the movement of the two floats, which is ordinarily simultaneous in opposite directions.

I have found that satisfactory results may be obtained by having the float 13 relatively stationary. I have also found that the horizontal movement of the float $9^a$ is greatly increased when this second stationary float 13 is employed.

The numerals 16 and 17 designate pairs of upstanding supports or posts disposed near the post 6 and upon the upper ends of which are mounted bearings 18, to receive horizontal rotatable shafts 19. Rigidly mounted upon the shafts 19 are pulleys 20, engaged by a common belt 21, which extends upwardly and engages a fly-wheel pulley 22. The pulley 22 is rigidly mounted upon a power distributing shaft 23, journaled through bearings 24, which are attached to the upper ends of upstanding supports or posts 25. Connected with the shaft 23 is a pulley 25ª, which is geared or connected in any suitable manner with the machinery or devices to be driven. Any other suitable means may be employed for this purpose. Rigidly connected with corresponding ends of the shafts 19 are outer pinions 26, which engage pairs of inner pinions 27, as more clearly shown in Fig. 2. These pairs of inner pinions are mounted upon stub shafts 28, journaled through bearings 29, which are fixed upon upstanding supports or posts 30, as shown.

The numeral 31 designates an upstanding guide, which fits within a longitudinal central opening 23, formed in the sides of a reciprocatory weight 33. The cable 9 has its free end forked, as shown, and connected with the upper end of the reciprocatory weight 33, by eye bolts 34 or the like. I have found that the best results are obtainable by having the weight 33 about one-half as heavy as the movable float or floats.

The reciprocatory weight 33 carries racks or sets of swinging pawls, finger, or elements 35 and 36, pivotally connected therewith by means of pins or stub shafts 37 (see more particularly Fig. 3). The inner enlarged ends 38 and 39 of the pawls 36 and 37, respectively, operate within recesses or pockets 40 and 41, as shown. The pockets 40 have lower horizontal shoulders 42 while the pockets 41 have upper horizontal shoulders 43. The sets of pawls 35 are free to swing downwardly only with relation to the reciprocatory weight 33 and the set of pawls 36 is free to swing upwardly only with relation to said weight. Leaf-springs 44 of suitable stiffness are attached to the weight 33 and engage pins 38ª carried by the inner enlarged ends 38 and 39 of the pawls and serve to normally retain such enlarged ends in engagement with the horizontal shoulders 42 and 43, thus returning the pawls to their normal positions. The sets of pawls 35 and 36 engage the pairs of inner pinions 27, which are disposed upon opposite sides of the reciprocatory weight 33. The mechanism to convert the reciprocatory motion into rotary motion is mounted upon the shore a suitable distance from the movable float or floats. The steel cable may be formed in two parts to be detached when it is desired to stop the operation of the machine.

The operation of the machine is as follows:—The float or floats are normally retained in their starting position by the weight 33 and returned thereto by the weight when moved therefrom. When the float is moved forwardly by the wave in the direction of the arrow, the cable 9 is pulled to elevate the reciprocatory weight 33. The sets of pawls 36 now turn the left hand pair of inner pinions 27, which in turn rotate the left hand pinion 26. This rotation is imparted to the pulley 20 and through the medium of the belt 21 to the pulley 22. Upon this upward movement of the weight 33, the other set of pawls 35 do not turn the right hand pinions 27 but trip over the same. When the float 9ª moves longitudinally in a reverse direction, the weight 33 descends, returning the float to its starting position. The set of pawls 35 now turns the right hand inner pair of pinions 27 while the other set of pawls 36 do not turn the left hand pair of pinions 27 but trip over the same.

It is to be understood that the form of my invention herewith shown and described is to be taken as a preferred example of the same and that certain changes in the shape, size, and arrangement of parts may be resorted to without departing from the spirit of the invention or the scope of the subjoined claims.

Having thus described my invention, I claim:—

1. In a machine of the character described, a plurality of spaced movable floats, anchor means for the floats so that the same will move away from each other when elevated by the waves, a flexible element connected with the floats to be pulled by the combined movements of the floats, and mechanism operated by the flexible element.

2. In a machine of the character described, a float, anchor chain or chains connected with the float, an upstanding supporting structure suitably mounted upon the shore, a pulley mounted upon the supporting structure, a flexible element connected with the float and passed about the pulley, a vertically movable weight connected with the flexible element and adapted to normally hold the float in such a position that the anchor chain or chains will be inclined, whereby when the waves elevate the float the same will move longitudinally in one direction to pull the flexible element for elevating the weight, sets of pawls pivotally connected with the weight, a pinion operated by one set of pawls upon the upward movement of the weight, and a pinion operated by the other set of pawls upon the downward movement of the weight.

3. In a machine of the character described, an upstanding supporting structure suitably mounted upon the shore, horizontal shafts connected with the supporting structure, a pinion rigidly connected with one end of each horizontal shaft, an inner supporting structure, pairs of pinions connected with the inner supporting structure and engaging the pinions carried by the horizontal shafts, a vertically movable weight disposed between the pairs of pinions, sets of pawls pivotally connected with opposite sides of the weight and engaging the pairs of pinions, a pulley mounted upon the upstanding supporting structure, above the weight, a cable connected with the weight and passed about the pulley, a movable float connected with the cable, pulleys carried by the horizontal shafts, a power distributing shaft disposed between the horizontal shafts, a pulley rigidly mounted thereon, and a belt engaging the pulleys carried by the horizontal shafts and the last named pulley.

4. In a machine of the character described, a plurality of movable floats, a pulley carried by one float, a cable attached to one float and passed about the pulley of the other float, a reciprocatory weight attached to the cable, and means operated by the weight.

5. In a machine of the character described, a float carrying a pulley, a movable float, a cable attached to the movable float and passed about the pulley, a support, a second pulley mounted upon the support and engaged by said cable, a weight connected with the cable, and means operated by the weight.

In testimony whereof I affix my signature in presence of two witnesses.

LUIS RAFAEL AGOSTINI.

Witnesses:
ESTEBAN GIL BORGES,
C. L. PARKER.

Copies of this patent may be obtained for five cents each, by addressing the "Commissioner of Patents, Washington, D. C."